(12) United States Patent
Sun et al.

(10) Patent No.: US 9,462,602 B2
(45) Date of Patent: Oct. 4, 2016

(54) SYSTEMS AND METHODS FOR PRIORITIZING A UE IN AN UPLINK SCHEDULER

(75) Inventors: Ying Sun, Sundbyberg (SE); Hongwei Wang, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 81 days.

(21) Appl. No.: 14/407,838
(22) PCT Filed: Jun. 14, 2012
(86) PCT No.: PCT/IB2012/053012
§ 371 (c)(1),
(2), (4) Date: Dec. 12, 2014
(87) PCT Pub. No.: WO2013/186594
PCT Pub. Date: Dec. 19, 2013

(65) Prior Publication Data
US 2015/0173099 A1 Jun. 18, 2015

(51) Int. Cl.
*H04W 72/12* (2009.01)
*H04W 72/10* (2009.01)
*H04L 1/18* (2006.01)
*H04W 72/04* (2009.01)
*H04W 88/08* (2009.01)

(52) U.S. Cl.
CPC ........ *H04W 72/1247* (2013.01); *H04L 1/1854* (2013.01); *H04W 72/0413* (2013.01); *H04W 72/0446* (2013.01); *H04W 72/10* (2013.01); *H04W 72/1268* (2013.01); *H04W 88/08* (2013.01)

(58) Field of Classification Search
None
See application file for complete search history.

(56) References Cited

U.S. PATENT DOCUMENTS

| 9,042,320 | B2* | 5/2015 | Kim | H04L 5/0007 370/229 |
| 2009/0113086 | A1* | 4/2009 | Wu | H04W 72/1284 710/56 |
| 2010/0077100 | A1* | 3/2010 | Hsu | H04W 72/1221 709/234 |
| 2010/0098011 | A1* | 4/2010 | Pelletier | H04W 72/1242 370/329 |
| 2010/0118892 | A1* | 5/2010 | Nguyen | H04W 88/02 370/474 |
| 2010/0232387 | A1* | 9/2010 | Marchand | H04W 72/1252 370/329 |
| 2012/0051255 | A1* | 3/2012 | Han | H04L 47/30 370/252 |
| 2013/0242726 | A1* | 9/2013 | Zhu | H04L 5/1469 370/229 |

FOREIGN PATENT DOCUMENTS

EP 2099249 A1 9/2009
WO 2009116939 A2 9/2009

OTHER PUBLICATIONS

"LTE; Evolved Universal Terrestrial Radio Access (E-UTRA); Medium Access Control (MAC) protocol specification (3GPP TS 36,321 version 10.5.0 Release 10)", Technical Specification, European Telecommunications Standards Institute (ETSI), 650, Route Des Lucioles; F-06921 Sophia-Antipolis; France, vol. 3GPP RAN 2, No. V10.5.0, Mar. 1, 2012, pp. 25-27, XP014070089.
SUNPLUS mMOBILE Inc: "LCG Reconfiguration via MAC CE", 3GPP DRAFT; R2-081880, 3rd Generation Partnership Project (3GPP), Mobile Competence Centre; 650, Route Des Lucioles; F-06921 Sophia-Antipolis; Cedex France, vol. RAN WG2, No. Shenzhen, China, Mar. 25, 2008, 4 pages, XP050139570.
Qasara: "Issue regarding Logical Channel Group (LCG)", 3GPP DRAFT; R2-085855-Logicalchannelconfig, 3rd Generation Partnership Project (3GPP), Mobile Competence Centre; 650, Route Des Lucioles; F-06921 Sophia-Antipolis: Cedex France, No. Prague, Czech Republic, Oct. 3, 2008, 4 pages, XP050320587.

* cited by examiner

*Primary Examiner* — Min Jung
(74) *Attorney, Agent, or Firm* — Patents on Demand, P.A.; Brian K. Buchheit; Scott M. Garrett

(57) ABSTRACT

Methods and devices to improve the efficiency of uplink scheduling among user equipment (UEs) are disclosed. In one aspect, a base station with a scheduler utilizes a notional or holding "LCG," in addition to LCGs that correspond to an LCG to which a UE maps one or more logical channels. This notional LCG is a dedicated LCG for maintaining temporary priority information based on the receipt of a scheduling request (SR) from the UE.

22 Claims, 10 Drawing Sheets

SYSTEMS AND METHODS FOR PRIORITIZING A UE IN AN UPLINK SCHEDULER

CROSS-REFERENCE TO RELATED APPLICATION

This application is a 35 U.S.C. §371 National Phase Entry Application from PCT/IB2012/053012, filed Jun. 14, 2012, and designating the United States.

TECHNICAL FIELD

This disclosure relates generally to resource allocation in wireless communication networks, and more particularly, to a method and apparatus for prioritizing scheduling requests received from one or more users of the network.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102, such as Node Bs (NBs) and evolved Node Bs (eNBs or eNodeBs) in a telecommunications network 100, to communication devices 104 (a.k.a., user equipments (UEs) 104). The base stations 102 may include an uplink scheduler 202 (see FIG. 2).

The LTE standard is primarily based on Orthogonal Frequency Division Multiplexing (OFDM) in the downlink, which splits the signal into multiple parallel sub-carriers in frequency, and Single Carrier Frequency Domain Multiple Access (SC-FDMA) in the uplink.

Currently, LTE does not support dedicated data channels; rather, shared channel resources are used in both the downlink and uplink transmissions. These shared resources, Downlink Shared Channel (DL-SCH) and Uplink Shared Channel (UL-SCH), are each controlled by a scheduler that assigns different parts of the downlink and uplink shared channels to different scheduling entities (e.g., UEs) for reception and transmission, respectively. These schedulers are in full control of in which sub-frame a UE should receive on DL-SCH, or is allowed to transmit on UL-SCH. Scheduling decisions are sent to each UE as downlink assignments and uplink grants. Downlink assignment information and uplink grants may be transmitted as Downlink Control Information (DCI), for instance, using L1/L2 control signaling.

The resource allocation to UEs on both the downlink and uplink is performed adaptively, taking into account considerations such as instantaneous traffic patterns and radio propagation characteristics of the each UE. In order to properly assign resources in LTE, the base station must be aware of the status of pending data in each UEs buffer. Information regarding the UE's buffer is currently communicated according to a standardized communication protocol illustrated in FIG. 2.

As shown in FIG. 2, scheduling of a UE may be initiated by the UE sending a scheduling request (SR) to a base station 102. The SR can be sent on a dedicated SR channel (D-SR) or on the contention based Random Access Channel (RA-SR). When receiving the SR from the UE, the base station may respond with an uplink scheduling grant, including information indicating the specific time/frequency resources the UE can use for an uplink transmission. Link adaptation is performed at the base station and the selected transport format is signaled to the UE.

Once the UE receives an uplink scheduling grant, the UE may then send a buffer status report (BSR) and/or data buffered by the UE for uplink transmission to network 100, depending on the size of the grant. The purpose of the BSR is to inform the base station (and thus, the scheduler) about the details of the UE's buffer status. This information includes, for instance, what kind of data and how many bits of data are in the UE's buffer at the time of the report. Currently, as illustrated in FIG. 3, uplink data, which is associated with a logical channel, is mapped by the UE to one of a maximum of four Logical Channel Groups (LCGs). Thus, the BSR reports on how many bits are contained in the UE's buffer (i.e., buffer size) for each of the corresponding LCGs. LTE currently defines two types of BSRs, long and short. The long BSR reports the amount of data for all four LCGs, while the short BSR reports only the amount of data for a single LCG.

The decision by the UE to send an SR may be triggered by a number of factors. For instance, a UE may be configured to send an SR to network 100 whenever new data is ready to be transmitted and the new data is associated with a logical channel having a higher priority than all of the logical channels with which the data already buffered for transmission is associated. Additionally, the UE may be configured to send an SR to network 100 whenever a certain amount of time has elapsed since the last transmission of a BSR, or whenever the serving cell changes.

The amount of resources granted by the base station can be of variable size, i.e., the uplink transmission that follows from the UE may contain a varied number of bits. However, the granted number of bits should be sufficient for a buffer status report to be included in the uplink transmission from the UE. If there are sufficient bits for additional information, the UE may include data from its buffer.

For each UE that it serves, the scheduler of the base station maintains its own LCGs corresponding to the LCGs of the UE, with estimates of the associated amount of data for the UE in each LCG. For clarity purpose, the LCGs, and corresponding information, maintained by the base station and scheduler may be noted as $LCG_{BS}$, a scheduler-side LCG, or a base station/scheduler LCG. Similarly, the LCGs, and corresponding information, maintained by the UE may be noted as $LCG_{UE}$, a UE-side LCG, or a UE LCG.

A Quality of Service (QoS) class identifier (QCI) is used to classify different services in order to achieve a QoS concept. QoS is used to assist the scheduler in prioritizing resource allocations among users and services, based on various requirements for service quality. QCIs classify different services, and the priority assigned to a given QCI/service indicates how important it is with respect to other QCIs/services. The priority is used by the scheduler; for instance, the service with highest priority should be scheduled first, while services with lower priority are scheduler after (all else being equal).

In the scheduler, the priority may be used to determine a "scheduling weight." Higher scheduling weight UEs will be scheduled prior to the ones with lower weight. A UE's scheduling weight may also be based on other parameters, such as channel quality; however the UE's priority typically influences greatly the UE's scheduling weight. In a system that is highly loaded with high priority UEs (UEs with high priority data to transmit on the uplink), those UEs with lower priority may not get scheduled for a significant amount of time due to their lower scheduling weight caused by their lower priority. The phenomenon is known as "starvation".

The Layer 3 (L3) of the LTE radio access network (RAN) contains the RRC (RRC) functionality of the radio network. Examples of RRC functionality are RRC connection setup, bearer setup, and handover procedures and configuration of measurements. The L3 control signaling carries information between the RRC layer in RAN and the corresponding layer in the wireless terminals (e.g., UEs), and is carried over so-called Signaling Radio Bearers (SRB) on the Physical Uplink Shared Channel (PUSCH) and Physical Downlink Shared Channels (PDSCH). The user plane data is carried on ordinary Radio Bearers (RB), and is also mapped to the PUSCH and PDSCH.

The performance of L3 control signaling, in terms of delay, directly impacts the quality of service (QoS) of the user plane data transmission. Since the L3 signaling and the user plane data are carried on the same physical channels (the PUSCH and PDSCH), the Signaling Radio Bearers (SRBs) need to be prioritized relative to other radio bearers. The allocation of PDSCH and PUSCH, to different radio bearers and Signaling Radio Bearers (SRBs), is administrated by the scheduler.

Under current technologies, the scheduling of grant transmission triggered by SRs remains inefficient. Because a UE may trigger an SR due to either the arrival of new data when all buffers of the UE are empty, or the arrival of data that has higher priority than the highest priority of the existing data, the base station and scheduler have limited information regarding priority of the pending data upon receipt of an SR. An SR can essentially be triggered by data having any priority level. Therefore, the scheduler must guess as to the priority of the data that caused the UE to send the SR. If the SR is not properly prioritized, the UE may be starved or lower priority data may be scheduled ahead of higher priority data, leading to inefficiencies.

Moreover, when a UE is not scheduled, the UE may keep sending SRs periodically and may also stay in discontinues transmission (DRX) awake mode which will cost the UE battery. In certain scenarios, when the SR is triggered by RRC signaling, if the UE is not scheduled quickly enough, the UE might drop.

Accordingly there exists a need for more efficient prioritization scheme for scheduling requests. Moreover, there exists a need for a method and device that limits starvation of UEs.

SUMMARY

Particular embodiments are directed to a method and scheduling device for prioritizing a UE for uplink scheduling purposes.

In one particular aspect, a method for prioritizing a UE in an uplink scheduler of a wireless communication network is provided. In some embodiments, the method includes associating scheduler-side logical channel group (LCG) information with the UE. The LCG information may comprise a first LCG corresponding to a first set of one or more logical channels (LC) and a second LCG that is a dedicated scheduling resource LCG. The first LCG has a first priority value and a first buffer size value and the second LCG has a second priority value and a second buffer size value. The method includes receiving a scheduling request (SR) from the UE and setting the second buffer size value to a non-zero value as a result of receiving the SR. After setting the second buffer size value to the non-zero value, the UE is prioritized according to the LCG information associated with the UE.

In certain embodiments, the method further includes selecting the UE to be a UE to which a grant message will be sent in a subsequent transmission time interval (TTI) after prioritizing the UE. In response to selecting the UE, the method may include adjusting the second buffer size value. Additionally, the method may include transmitting the grant message to the UE and receiving a buffer status report (BSR) transmitted by the UE. According to certain aspects, the BSR indicates that the UE has data in a transmit buffer associated with a logical channel mapped to the first LCG, and the method further comprises updating the first buffer size value based on a buffer size value included in the BSR, in response to receiving the BSR. In certain embodiments, the first priority value is greater than the second priority value.

According to certain aspects, the scheduler-side LCG information may also include a third LCG corresponding to a third set of logical channels, where the third LCG has a third priority value and a third buffer size value. In this case, the second priority value may be greater than the third priority value and the first priority value may be greater than the second priority value. Further, a signal radio bearer (SRB) may be mapped to the first LCG and a data radio bearer (DRB) may be mapped to the third LCG by the UE.

In certain embodiments, the method also includes, in response to receiving the SR, activating an SR-timer associated with the UE. In response to expiration of the SR-timer, the priority of the second LCG is increased or the first buffer size value is increased. Similarly, the method may include, in response to receiving the SR, activating an SR-timer associated with the UE. Also, in response to selecting the UE, the method may include deactivating the SR-timer.

In certain embodiments, the method further comprises initializing a counter associated with the UE; in response to receiving the SR, incrementing the counter; determining whether the counter exceeds a counter threshold; and in response to determining that the counter exceeds the counter threshold, increasing the second priority value or increasing the first buffer size value. The method may also include initializing a counter associated with the UE; in response to receiving the SR, incrementing the counter; further in response to selecting the UE, re-initializing the counter.

In certain embodiments, the method may be characterized in that the first LCG is mapped to one or more logical channels by the UE and the second, SR dedicated, LCG is not mapped to any LCs by the UE.

According to a certain aspect, the LCG information may further comprise a fourth LCG, corresponding to a fourth set of one or more logical channels, where the fourth LCG has a fourth priority value and a fourth buffer size value. Additionally, the LCG information further comprises a fifth LCG, corresponding to a fifth set of one or more logical channels, where the fifth LCG has a fifth priority value and a fifth buffer size value. In this embodiment, the second priority value is greater than the third, fourth, and fifth priority values and the first priority value is greater than the second priority value. The first, third, fourth, and fifth LCGs are mapped to one or more LCs by the UE, but the second LCG is not mapped to any LCs by the UE.

In certain embodiments, the method may further include receiving a subsequent scheduling request from the UE; determining whether an LCG with a higher priority value than the second priority value has a non-zero buffer size, an if there is no LCG with (i) a higher priority value than the second priority value and (ii) a non-zero buffer size, then setting the second buffer size value to a non-zero value in response to the determination.

Particular embodiments provide for a base station having a scheduler configured to perform the prioritization and data grant methods described herein.

In certain embodiments, a base station having in uplink scheduler configured to prioritize UEs is provided. The uplink scheduler is configured to prioritize a UE by, among other things, associating logical channel group (LFG) information with the UE. The LCG information comprises: a first priority value identifying a priority of a first LCG; a first buffer size value associated with the first LCG; a second priority value identifying a priority of a second LCG, wherein the second LCG is a dedicated scheduling resource LCG, and a second buffer size value associated with the second LCG. The scheduler is further configured to receive a scheduling request (SR) from the UE, set the second buffer size to a non-zero value as a result of receiving the SR, and prioritize the UE using the LCG information associated with the UE after setting the second buffer size value to the non-zero value.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to a method and device for scheduling UEs in a wireless communication network.

Figure 9A:
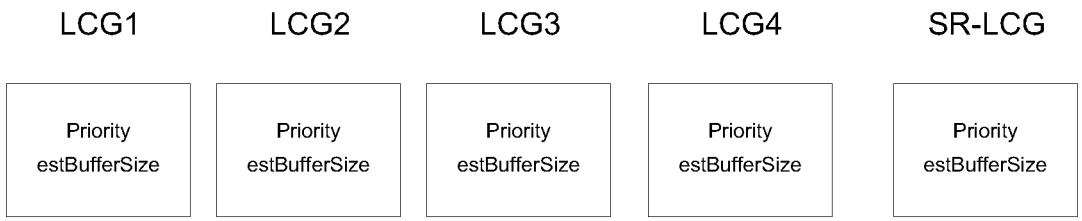
FIG. 9 is an illustration of scheduler-side logical channel groups (LCGs) in accordance with exemplary embodiments.
Figure 10:
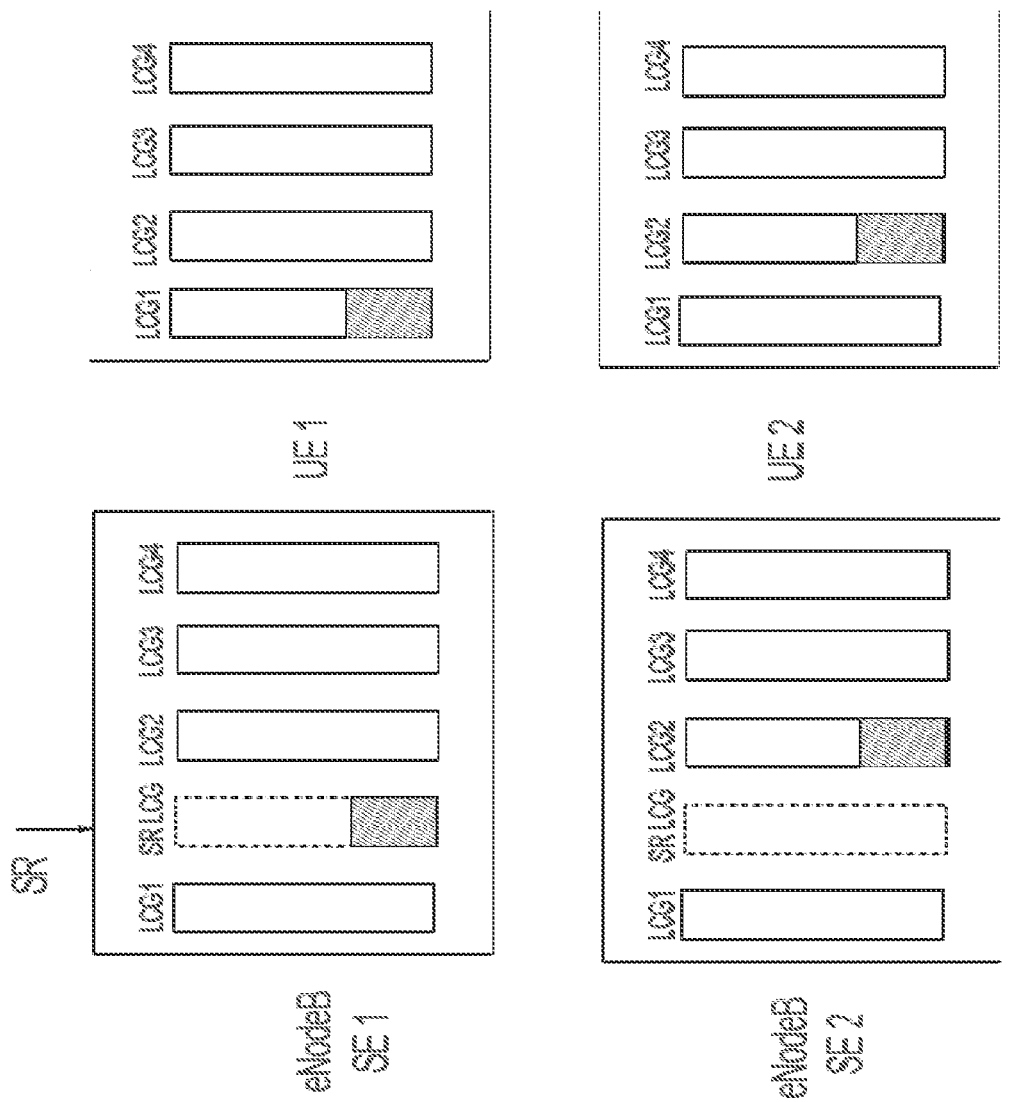
FIG. 10 is an example visualization of logical channel groups (LCGs) in accordance with exemplary embodiments.

In one particular aspect, an uplink scheduler 202, for example, in a base station 102 of an LTE wireless communication network 100, maintains, for each of a plurality of UEs served by the base station, logical channel group (LCG) information associated with the UE. For instance, for each of the UEs, the scheduler 202 of base station 102 may maintain four LCGs as shown in FIG. 10. An LCG maintained by a base station 102 may be denoted herein as a $LCG_{BS}$ and an LCG maintained by UE 104 may be denoted $LCG_{UE}$. In some embodiments, as shown in FIG. 9A, each $LCG_{BS}$ is a data structure that includes a priority field and a buffer size field. For a given UE, each of the LCGs (i.e., LCG1 . . . LCG4) maintained by base station 102 is used to store a value representing the buffer size of a corresponding LCG maintained by the UE. That is, at least some of the LCGs maintained by base station 102 are associated with an LCG maintained by the UE 104.

Figure 1:
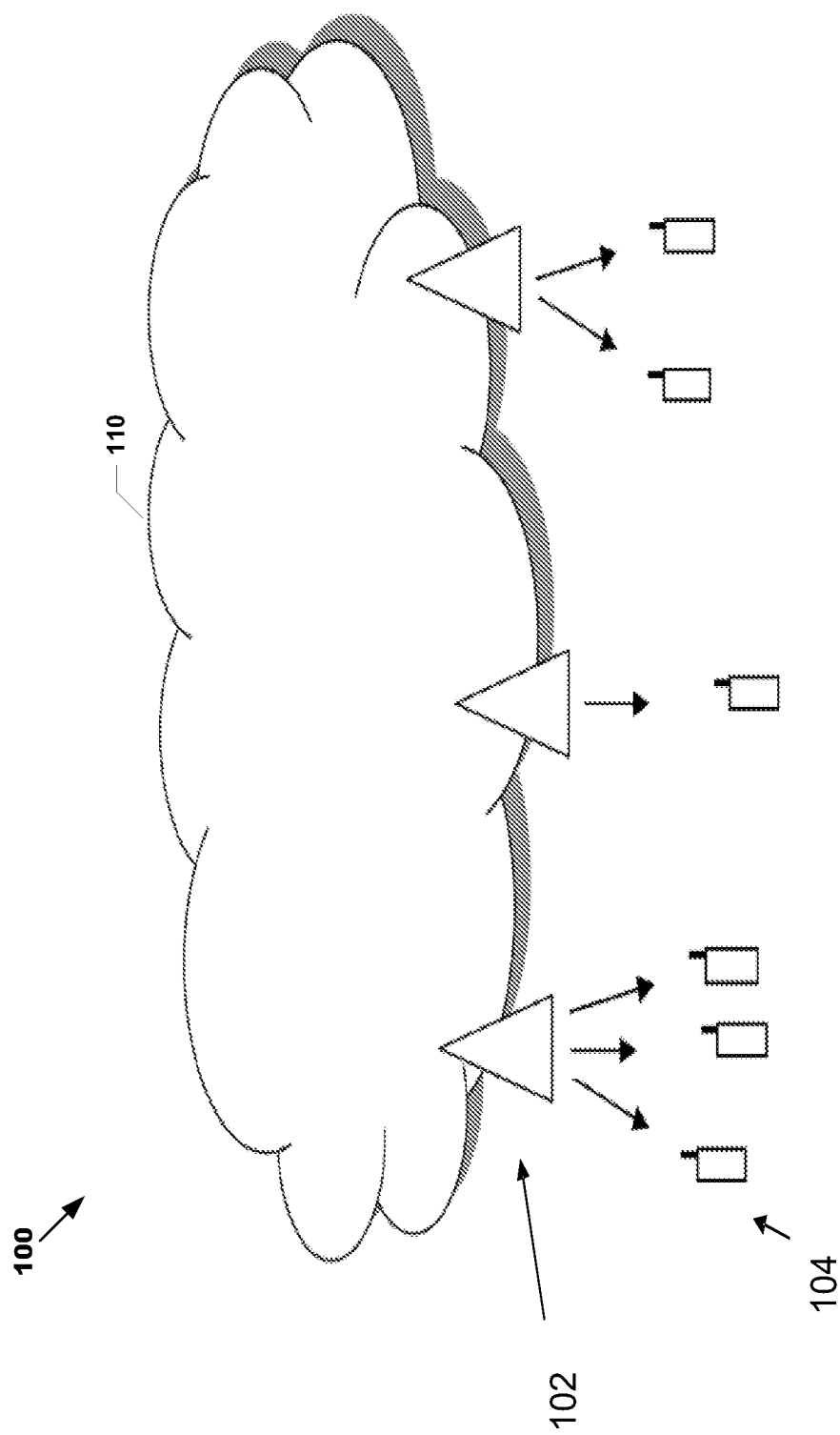
FIG. 1 is an illustration of a wireless communication system.
Figure 2:
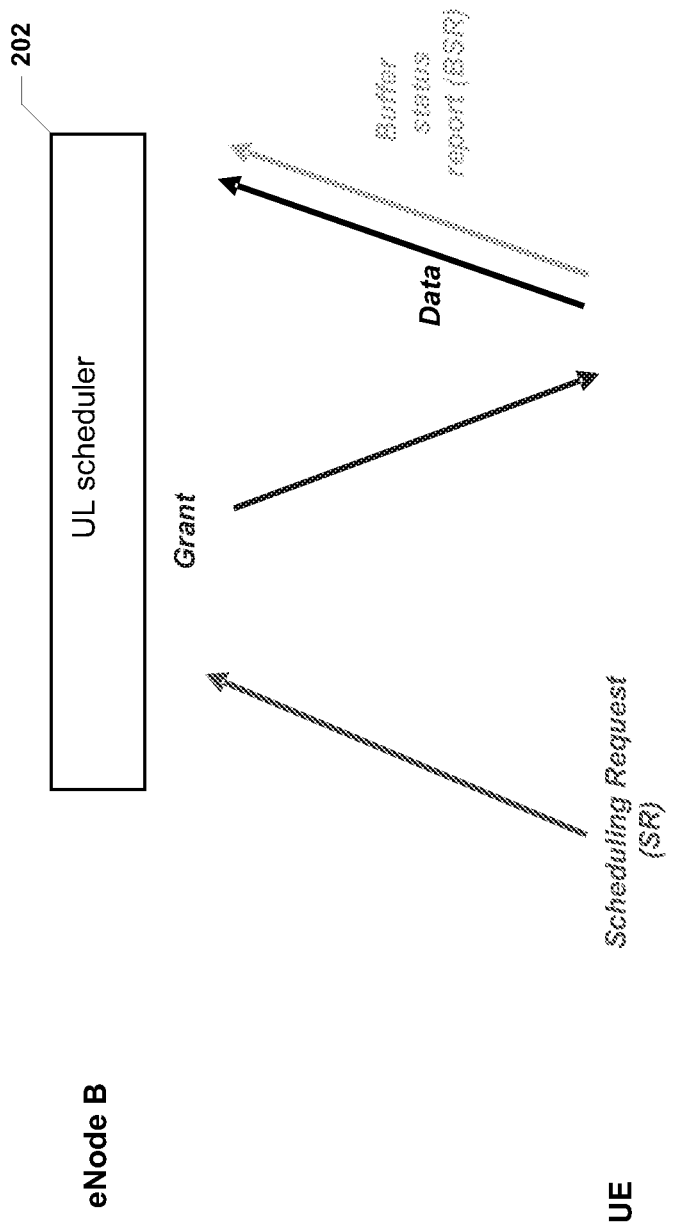
FIG. 2 illustrates a series of exemplary UE-eNodeB communications.
Figure 3:
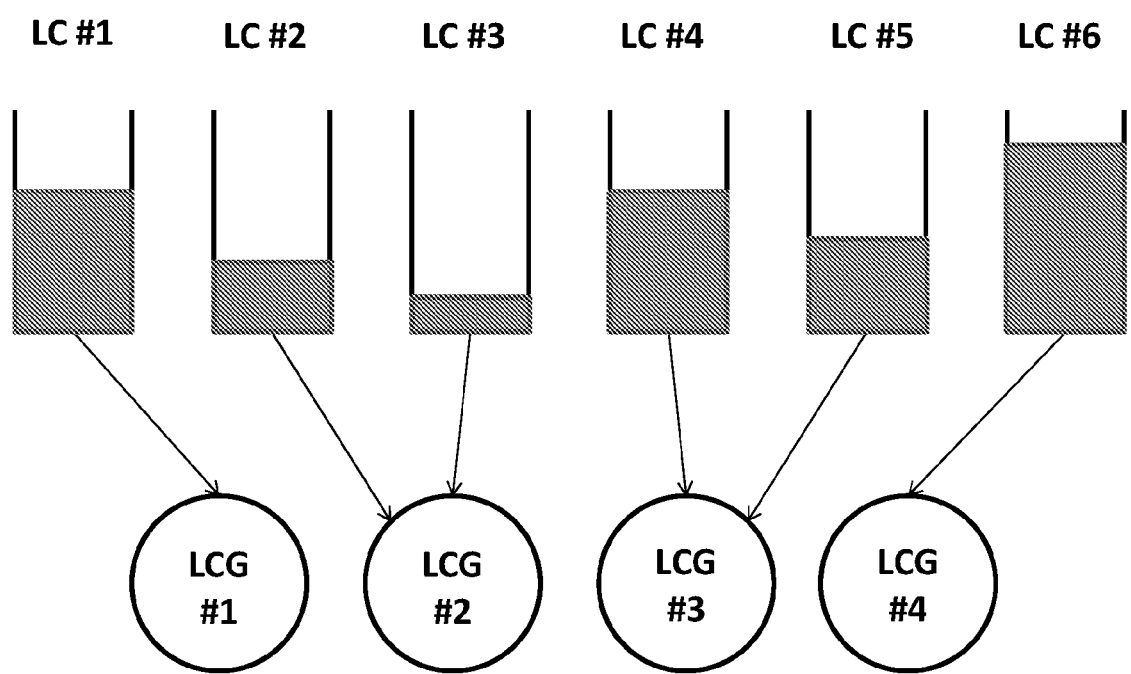
FIG. 3 illustrates the mapping of logical channels to logical channel groups.

For example, referring to FIG. 10, LCGs 1-4 maintained by base station 102 correspond to LCGs 1-4, maintained by UE 104. Thus, in this way, the buffer size value of $LCG_{BS}1$ is an estimate of the size of the transmit buffer in the UE 104 that is associated with $LCG_{UE}1$. As shown in FIG. 3 and discussed above, UE 104 maps logical channels (LCs) (also known as "radio bearers") to logical channel groups (LCGs) (also known as "radio bearer groups") in the UE. Thus, for example, the buffer size of $LCG_{UE}1$ represents the sum of the buffer sizes of each LC that UE 104 maps to $LCG_{UE}1$.

In order to improve efficiency of uplink scheduling among the UEs, the scheduler also utilizes a notional or holding "LCG," referred to herein as an "SR-LCG." Thus, in some embodiments, the LCG information maintained by the base station includes not only LCGs 1-4, but also SR-LCG. The SR-LCG is a dedicated LCG for maintaining temporary priority information based on the receipt of an SR from the UE. According to certain aspects of the invention, the SR-LCG is maintained by the scheduler and does not correspond to any $LCG_{ue}$ (i.e., any LCG maintained by the UE). Thus, the UE does not map any LCs to SR-LCG. Accordingly, the SR-LCG may not be known to the UEs in communication with the scheduler.

In certain embodiments, the scheduler assigns a priority to the SR-LCG that is lower than the highest priority LCG, but higher than one or more remaining LCGs. For instance, the scheduler may assign the SR-LCG (and thus, assign SRs) a priority that is higher than the LCG with the highest DRB service, and lower than the LCG with the lowest SRB service. According to certain aspects, this priority for the SR-LCG may be increased based on an internal timer or counter in order to avoid the potential starvation caused by the existence of higher priority UEs.

According to certain embodiments, when the scheduler 202 receives an SR from UE 104, the scheduler updates the buffer size value of the SR-LCG associated with the UE that transmitted the SR. The scheduler will then prioritize the UE using the LCG information associated the UE (e.g., the buffer size value of the SR-LCG in conjunction with the size/priority value of the remaining LCGs.)

Figure 4:
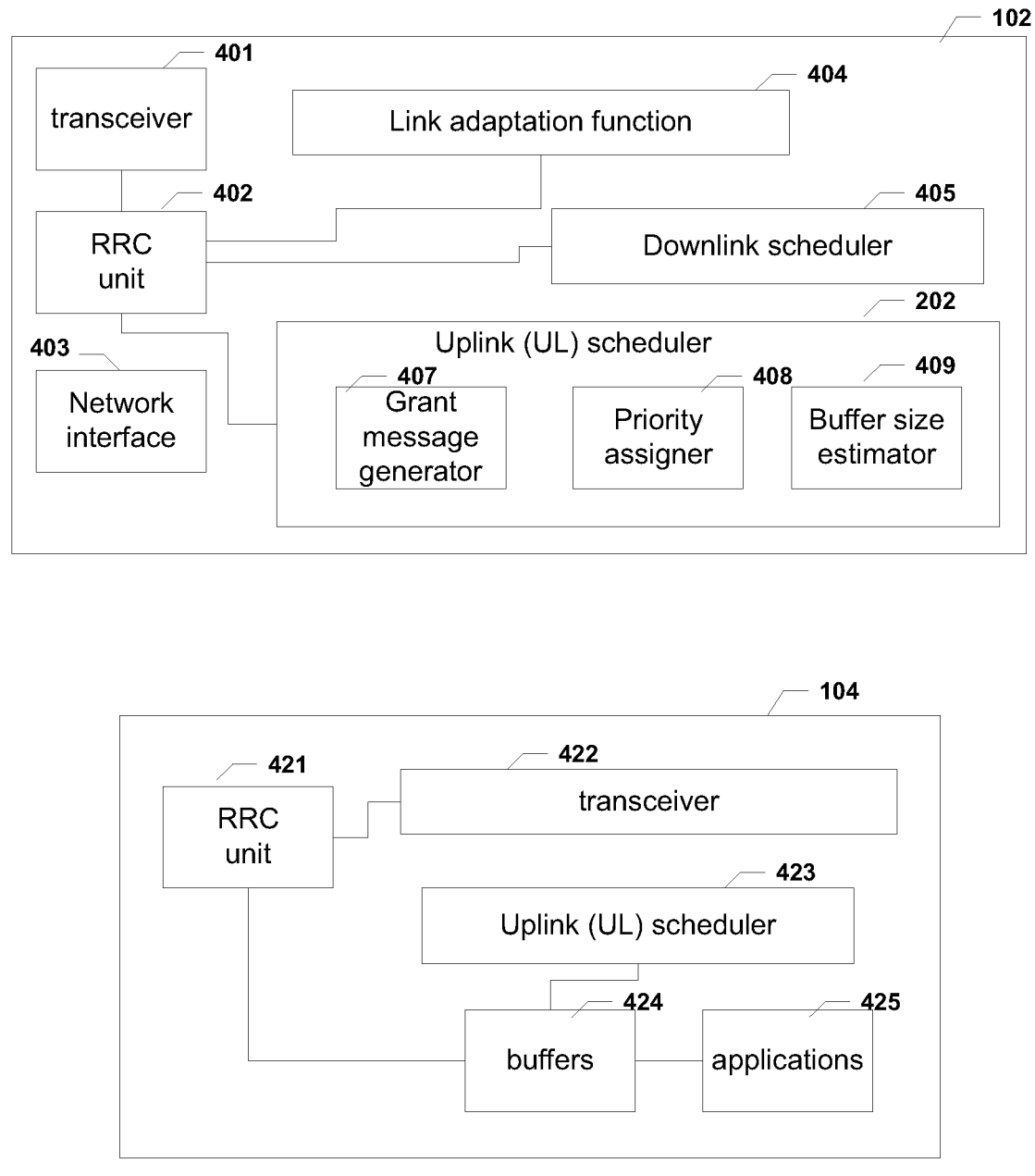
FIG. 4 is a block diagram of a base station, scheduler, and UE in accordance with exemplary embodiments.

FIG. 4 illustrates a block diagram of an exemplary base station 102 and scheduler 202, along with a representative UE 104. Base station 102 comprises a transceiver 401; radio resource control unit 402; a network interface 403 for connecting the base station to a backend network 110; and scheduler 202. The transceiver 401 is configured to facilitate communication with a plurality of UEs in wireless communication network 100.

The radio resource control (RRC) unit 402 is configured to perform RRC functionality including L3 signaling between base stations and wireless terminals. To this end RRC unit 402 may include an L3 signal handler and a link adaptation function 404 among other constituent functionalities and units. The link adaptation function 404 serves to decide the modulation and coding scheme of the transport block transmitted between the UE 104 and base station 102, and can comprise a separate unit or be included in other functionalities including scheduler 202.

The base station 102 comprises both uplink (UL) scheduler 202 and downlink (DL) scheduler 405. According to certain aspects, the uplink (UL) scheduler 202 prioritizes transmissions from competing UEs. Uplink (UL) scheduler 202 can comprise or co-exist with an uplink grant message generator 407 and wireless terminal buffer size estimator 409. As uplink (UL) scheduler 202 prioritizes the transmissions from the competing UEs, including UE 104, uplink grant message generator 407 issues one or more message(s) (grant messages) which are sent on the downlink from the base station 102 via transceiver 401 to one or more wireless terminals in network 100. The uplink grant message generator 407 can be either considered as part of scheduler 202 as shown, or can comprise a separate unit or functionality apart from scheduler 202.

The functionalities of RRC unit 402, scheduler 202, and uplink (UL) scheduler 202, and uplink grant message generator 407 in particular, can be realized by one or more (e.g., distributed or shared) controller(s) or processor(s).

As further illustrated in FIG. 4, a representative wireless terminal, UE 104, comprises a terminal transceiver 422; terminal RRC unit 421; terminal uplink (UL) scheduler 423; terminal buffer(s) 424; and one or more terminal application(s) 425 which can be executed by or performed by UE 104. The terminal application(s) 425 can comprise or pertain to one or more services in which UE 104 can participate or engage in wireless communication network 100. The terminal RRC unit 421 can comprise various sub-functionalities or sub-units, such as and RRC signal handler. Locations of various functionalities or sub-functionalities are typically implementation issues which are addressed by the terminal vendor.

Figure 5:
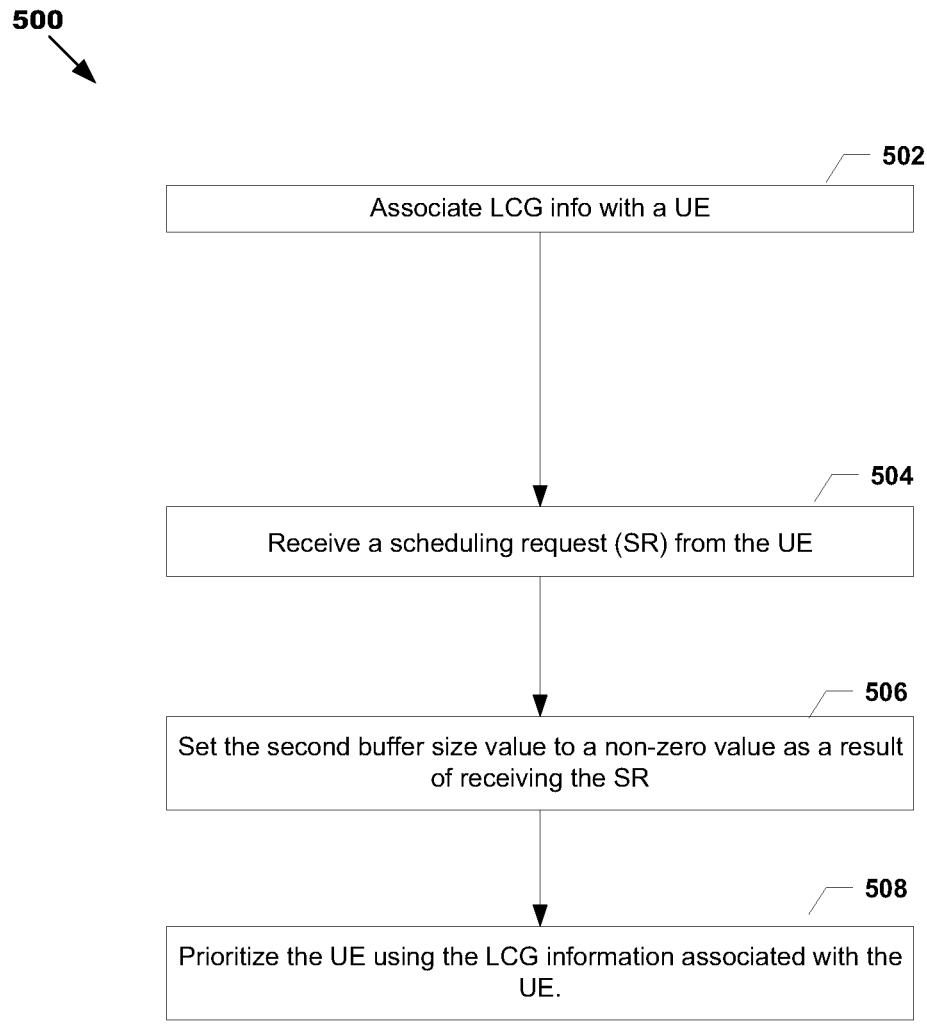
FIG. 5 is a flow chart illustrating a process for prioritizing UEs in accordance with exemplary embodiments.

Referring to FIG. 5, FIG. 5 illustrates a process 500 for prioritizing a UE 104 in an uplink scheduler 202 of a wireless communication network 100.

Process 500 may begin with step 502, where the scheduler 202 associates LCG information with the UE 104. Specifically, the, scheduler 202 may maintain a set of LCGs (e.g., $LCG1_{BS} \ldots LCG4_{BS}$ and SR-LCG; see FIG. 9A) that store data estimating corresponding buffer sizes in the UE 104.

As discussed above, the UE 104 maps LCs to LCGs, for instance, as shown in FIG. 3. In certain aspects, the signal radio bearer (SRB) may be mapped to a first $LCG_{UE}$, while the data radio bearer (DRB) may be mapped to another $LCG_{UE}$.

According to certain embodiments, the LCG information maintained by the scheduler 202 includes information about the estimated amount of data at the UE that corresponds to a given LCG, and the priority of the LCG relative to other LCGs. For instance, the information for each LCG at the scheduler 202 may include a priority value and a buffer size value. In the example illustrated in FIG. 9A, the scheduler 202 associates four LCGs: $LCG1_{UE}$, $LCG2_{UE}$, $LCG3_{UE}$, and $LCG4_{UE}$, with the UE 104. According to certain aspects of the invention, scheduler 202 also maintains an SR-LCG for the UE 104. As with the scheduler-side LCGs, the SR-LCG also includes a priority value and a buffer size value, for instance, as illustrated in FIG. 9A.

Figure 9B:
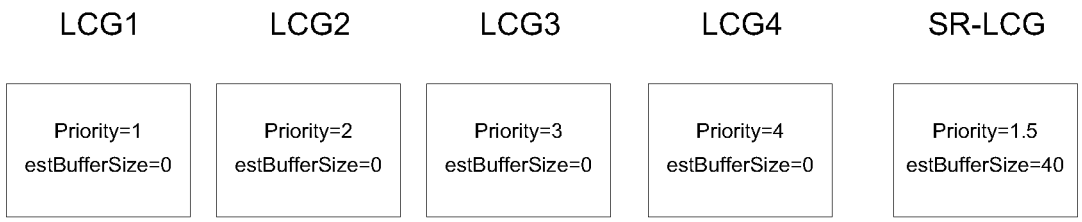

According to certain embodiments, the initial priority value of the SR-LCG may be set such that it is lower than the priority of the highest priority LCG, but higher than other LCGs. For instance, as shown in FIG. 9B, the priority of the SR-LCG may be between that of LCG1 and LCG2. In the example of FIG. 9B, LCG1 has a relative priority of "1", the SR-LCG has a priority of "1.5", LCG2 has a priority of "2," LCG3 has a priority of "3", and LCG4 has a priority of "4". In certain aspects, the initial priority of SR-LCG is higher than that the highest DRB service, but lower than that of the LCG with the lowest SRB service.

In step 504, the scheduler 202 receives an SR from the UE 104. According to certain aspects, the SR does not indicate the nature of the data in the buffer of UE 104. For instance, the SR may consist of a single bit. Thus, in some embodiments, the SR can only have a value of 0 or a value of 1.

Figure 9C:
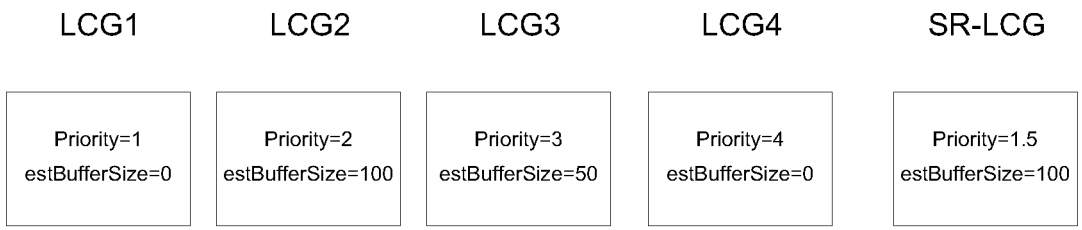

In step 506, the scheduler 202 sets the buffer size value of the SR-LCG to a non-zero value in response to receiving the SR. For instance, the scheduler 202 may set to the buffer size value of the SR-LCG to a non-zero value as shown in FIG. 9C. The actual value used is not important. In some embodiments, step 506 is not performed if the buffer size value of SR-LCG is already set to a non-zero value. Additionally, in some embodiments, step 506 is not performed if LCG1 has non-zero buffer size value.

According to certain aspects, a non-zero value for the buffer size of the SR-LCG does not indicate that the UE 104 has any particular type (or amount) of data in its buffer. Rather, the SR-LCG buffer size value is simply used as a place holder to indicate that the UE 104 has submitted an SR In step 508, the scheduler 202 uses the LCG information that it maintains to prioritize the UE 104. Depending on the weighting algorithm used, the UE 104 may now have a higher priority than previous iterations. For instance, in the example of FIG. 9B, prior to the receipt of the SR, the highest priority LCG having non-zero buffer size was LCG2, which has a priority of "2". However, after step 506, the UE now has a non-zero buffer size for an LCG with priority of "1.5"—the SR-LCG, as shown in FIG. 9C. In this manner, the overall priority of the UE may be increased without adjusting the buffer size of the highest priority LCG, which could lead to the inefficient use of scheduling resources.

Figure 6:
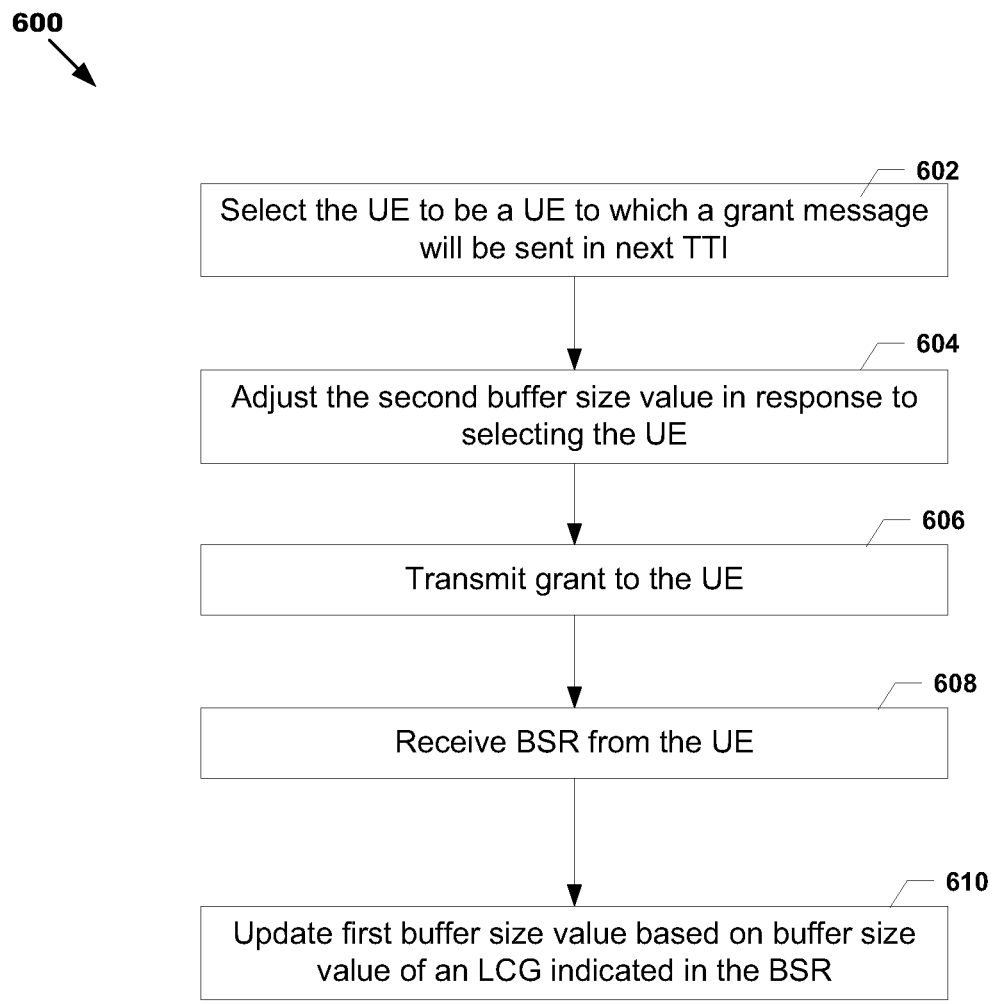
FIG. 6 is a flow chart illustrating a process for prioritizing UEs in accordance with exemplary embodiments.

FIG. 6 illustrates a process 600 that may be performed by base station 102 and scheduler 202 after step 508 is performed.

In step 602, after prioritizing the UE 104, the scheduler 202 selects the UE 104 to be a UE to which a grant message will be sent in a subsequent transmission time interval (TTI). The size of the grant given to the UE may vary. For instance, the grant may be large enough for the UE 104 to empty its buffer, large enough to transmit a portion of the data in the UE buffer of UE 104, or only large enough for the UE 104 to transmit a BSR.

In step 604, the scheduler 202 adjusts the buffer size value of the SR-LCG in response to selecting the UE 104 to receive a grant message. This may include, for instance, setting the buffer size value to zero or a minimum value determined by a communications standard, such as LTE.

In step 606, the scheduler 202 transmits the grant message to the UE 104.

In some embodiments, upon receiving the grant from scheduler 202, the UE 104 is allocated sufficient resources to transmit a buffer status report to the scheduler 202. In step 608, the scheduler 202 receives the buffer status report from UE 104 which may indicate, for example, that UE 104 has data in a transmit buffer that is associated with a logical channel mapped to the first $LCG_{UE}$ ($LCG1_{UE}$). This would correspond to, for instance, radio control data. Alternatively, or in addition to the first LCG data, the BSR may indicate that the UE has data in a transmit buffer associated with logical channels mapped to one or more LCGs with a lower priority value than the first LCG.

Figure 9D:
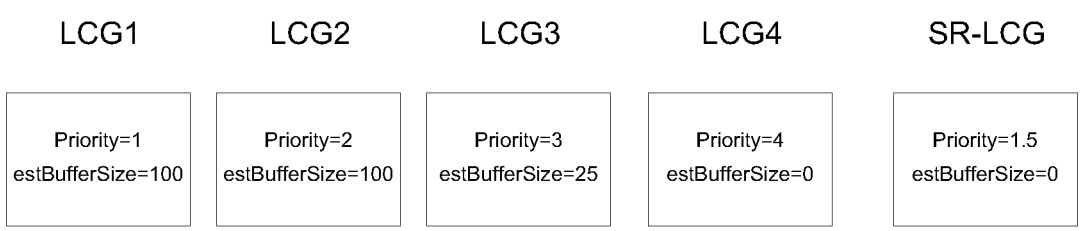

In step 610, the buffer size value of the $LCG_{BS}$ corresponding to the LCG indicated in the BSR is updated in response to the BSR. For example, if the BSR indicates that the UE has data associated with logical channels mapped to LCG1, the scheduler could adjust the buffer size value of $LCG1_{BS}$. For instance, as shown in FIG. 9D, the buffer size of LCG1 is increased to "100." In certain instances, the BSR may indicate that the nature of the data in the buffer of UE 104 has changed, in which case, the scheduler 202 would adjust the buffer size value in one or more of the LCGs based on the BSR. This is shown, for example, in FIG. 9D where the buffer size of LCG3 has been reduced from "50" to "25". Because a grant was sent to UE 104, the buffer size of the SR-LCG set at its minimum value (e.g., zero).

In certain embodiments, the scheduler 202 may implement one or more additional processes in order to limit starvation of UEs in the communication network 100. These processes may include, for example, utilizing a timer or counter to keep track of SR requests and/or boosting the priority of the SR-LRC based on the counter or timer values. For instance, in the case where the number of received SRs exceeds a predefined threshold, or when the time since the first un-processed SR reaches a predefined limit, the SR-LCG priority can be boosted to higher priority level. According to certain aspects, the SR-LCG is never boosted higher than the highest priority of SRB data, used for example, for RCC control signaling.

Figure 7:
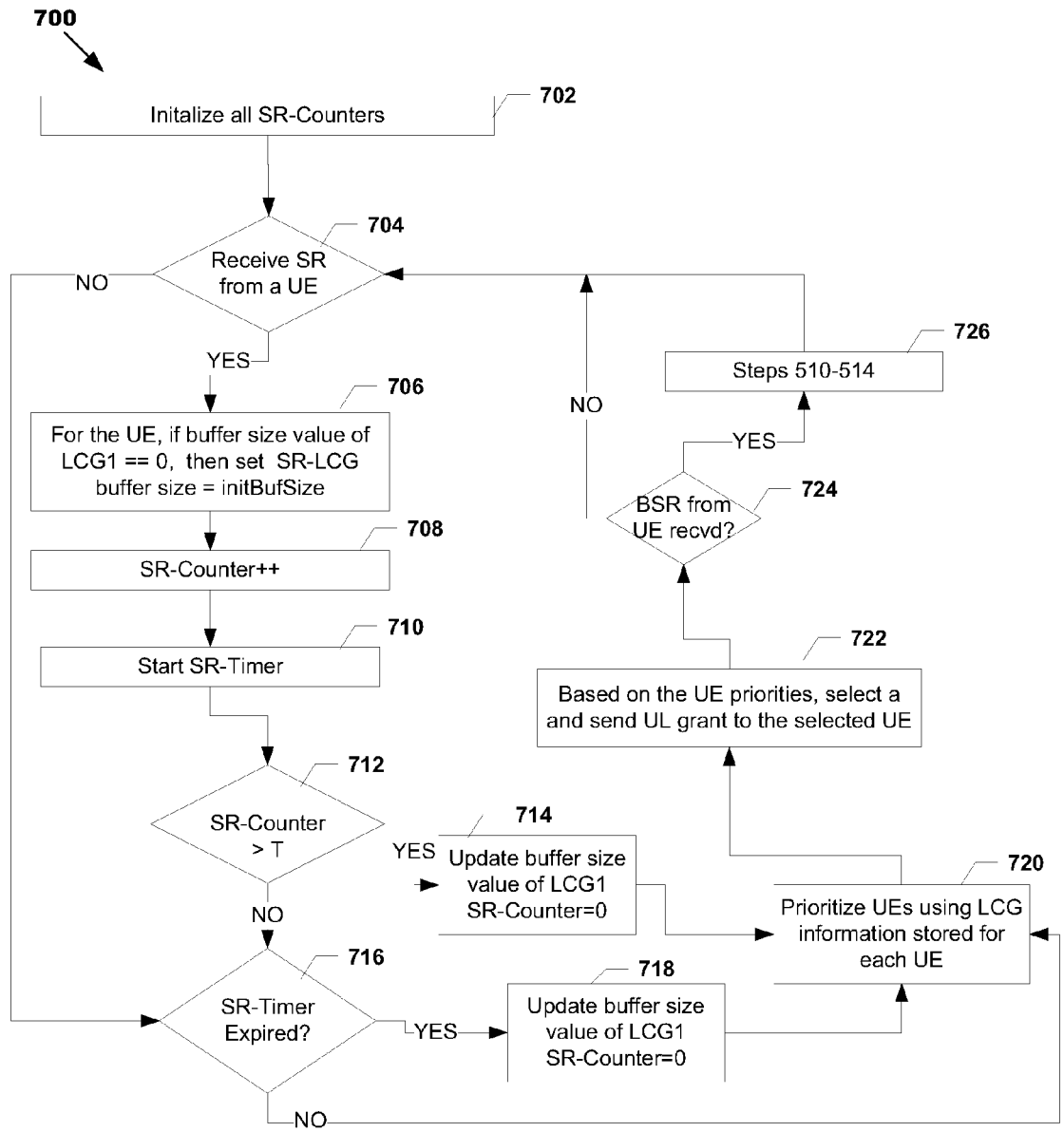
FIG. 7 is a flow chart illustrating a process for prioritizing UEs in accordance with exemplary embodiments.

FIG. 7 illustrates a process 700 for utilizing a counter and/or timer to limit starvation of UE 104. Although both counter and timer techniques are described in accordance with process 700, it will be apparent to one of ordinary skill in the art that the counter and timer techniques described herein may be used independently or in conjunction with each other to limit starvation of a UE.

At step 702, the scheduler 202 initializes a counter, the SR Counter, associated with the SR-LCG. This may include, for example, setting the counter to an initial value of zero.

At step 704, the scheduler 202 determines whether a scheduling request has been received from UE 104. If a scheduling request has been received, the scheduler 202 may check whether any LCGs with a higher priority than the SR-LCG have a non-zero buffer size value and adjust the SR-LCG accordingly. For instance, in step 706, if LCG1 has a buffer size value of 0, the scheduler 202 will set the buffer size of the SR-LCG to an initalBuffer value as shown by step 708. The scheduler may then increment the SR Counter value.

If it is determined at step 104 that no scheduling request has been received, the process may progress to a subsequent step without updating the buffer size value of the SR-LCG. For instance, the process may move to a step related to an SR Timer, such as step 716.

In step 710, the scheduler 202 initiates a SR Timer.

In step 712, the scheduler 202 determines whether the SR Counter has exceeded a predetermined threshold. If the SR Counter has exceeded the predetermined threshold, the scheduler may proceed to step 714 and update the buffer size value of an $LCG_{BS}$ having a higher priority value than the priority value of the SR LCG. For instance, the scheduler 202 may increase the buffer size value of $LCG1_{bs}$. By increasing the buffer size value of $LCG1_{bs}$, the scheduler 202 increases the likelihood that UE 104 will be selected to receive a data grant, thereby reducing the chance of starvation of UE 104. Upon updating the buffer size value, the scheduler also resets the SR Counter. The scheduler may also boost the priority of the SR-LCG based on the SR Counter value.

If the SR Counter has not exceeded the predetermined threshold, the scheduler 202 may then determine whether the SR Timer has exceeded a predetermined threshold (e.g., expired) in step 716. If the SR Timer has expired, the scheduler may proceed to step 718 and update the buffer size value of an $LCG_{BS}$ having a higher priority value than the priority value of the SR-LCG, or boost the priority of the SL-LCG. As with step 714, the scheduler 202 may increase the buffer size value of $LCG1_{bs}$. By increasing the buffer size value of $LCG1_{bs}$, the scheduler 202 increases the likelihood that UE 104 will be selected to receive a data grant, thereby reducing the chance of starvation of UE 104. Upon updating the buffer size value, the scheduler resets the SR Timer.

Following steps 714 or 718, or if the scheduler 202 determines that neither the SR Counter nor SR Timer has exceed its respective threshold, the scheduler 202 may proceed to step 720. In step 720, the scheduler 202 prioritizes UE 104 based on the LCG information associated with the UE 104. For instance, the UE may be prioritized based on the priority values and buffer sizes of the LCGs maintained by the scheduler for the UE, or a weight determined at least in part on the priority values and buffer sizes. In this way, when an SR is received, the UE will necessarily have a priority at least as high as the priority given to the SR-LCG.

In step 722, based at least in part on the result of the prioritization of step 720, scheduler 202 selects one or more UEs from among the plurality of UEs in network 100 and transmits a grant to the selected UEs. For instance, the scheduler 202 may transmit a grant to UE 104 in a subsequent TTI. According to certain aspects, this step may further include deactivating an SR Timer or resetting an SR Counter.

In step 724, the scheduler checks whether a BSR has been received from UE 104. If a BSR has been received, the scheduler 202 may proceed as described in step 610 of process 600 as previously described. Otherwise, the scheduler may return to step 704.

According to certain embodiments, the SR-LCG is only used, or its buffer size is only updated, if the buffer size is empty (i.e., at a minimum) for all higher priority LCGs at the base station. In this instance, the scheduler 202 would perform the additional step of determining whether an LCG with a higher priority value than the SR-LCG priority value has a non-zero buffer size, and, only if there is no LCG with a higher priority value than the SR-LCG priority value and a non-zero buffer size, setting the SR-LCG buffer size value to a non-zero value.

According to certain embodiments, the processes described in FIGS. 5-7 may be performed by a base station, for instance, as depicted in FIGS. 4 and/or 8.

Figure 8:
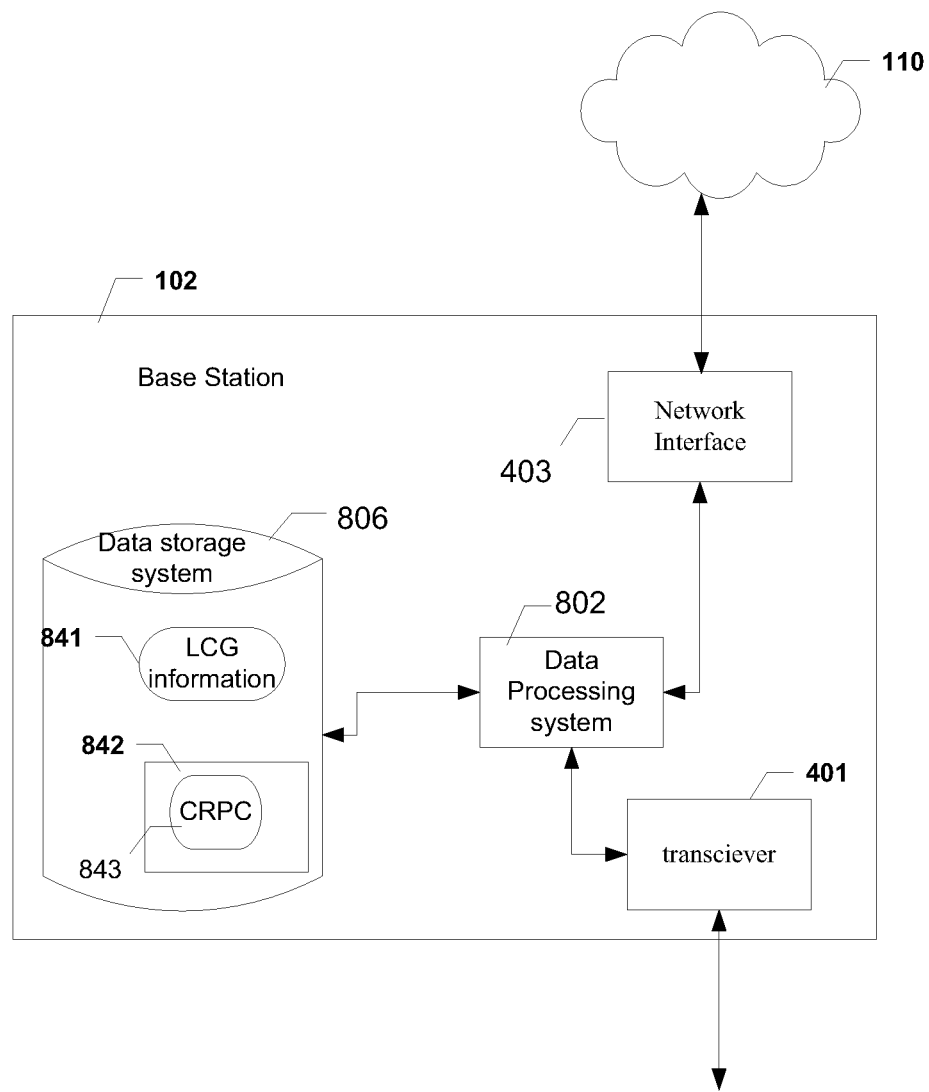
FIG. 8 is a block diagram of a base station and scheduler in accordance with exemplary embodiments.

Referring now to FIG. 8, FIG. 8 illustrates a block diagram of base station 102, according to some embodiments. As shown in FIG. 8, base station 102 may include: a data processing system 802, which may include one or more data processing devices each having one or more microprocessors and/or one or more circuits, such as an application specific integrated circuit (ASIC), Field-programmable gate arrays (FPGAs), etc; network interface 403; transceiver 401 for receiving data from and transmitting data to UEs; a data storage system 806, which may include one or more non-transitory computer-readable mediums, such as non-volatile storage devices and/or volatile storage devices (e.g., random access memory (RAM)).

In embodiments where data processing system 802 includes a processor (e.g., a microprocessor), a computer program product is provided, which computer program product includes: computer readable program code 843, which implements a computer program, stored on a computer readable medium 842, such as, but not limited, to magnetic media (e.g., a hard disk), optical media (e.g., a DVD), memory devices (e.g., random access memory), etc. In some embodiments, computer readable program code 843 is configured such that, when executed by data processing system 802, code 843 causes the processing system 802 to perform steps described above (e.g., steps describe above with reference to the flow chart shown in FIGS. 5-7).

In other embodiments, base station 102 may be configured to perform steps described above without the need for code 843. For example, data processing system 802 may consist merely of specialized hardware, such as one or more application-specific integrated circuits (ASICs). Hence, the features of the embodiments described above may be implemented in hardware and/or software. For example, in some embodiments, the functional components of base station 802 described above (e.g., the UL scheduler 202) may be implemented by data processing system 802 executing computer instructions 843, by data processing system 802 operating independent of any computer instructions 843, or by any suitable combination of hardware and/or software.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for prioritizing transmission for a user equipment (UE) from a plurality of UEs, in an uplink scheduler of a wireless communication network, comprising:
    associating logical channel group (LCG), information with the UE by mapping one or more logical channels (LCs) to the LCG information, the LCG information comprising:
        a first LCG corresponding to a first set of the one or more LCs the first LCG having a first priority value and a first buffer size value; and
        a second LCG having a second priority value and a second buffer size value, wherein the second LCG is a dedicated scheduling resource LCG;
    receiving a scheduling request (SR) from the UE;
    setting the second buffer size value to a non-zero value as a result of receiving the SR; and
    after setting the second buffer size value to the non-zero value, prioritizing the transmission for the UE using the LCG information associated with the UE.

2. The method of claim 1, further comprising:
    after prioritizing the UE, selecting the UE to be a UE to which a grant message will be sent in a subsequent transmission time interval (TTI); and
    in response to selecting the UE, adjusting the second buffer size value.

3. The method of claim 2, further comprising:
    transmitting the grant message to the UE; and
    receiving a buffer status report (BSR) transmitted by the UE, wherein the BSR indicates that the UE has data in a transmit buffer associated with a logical channel mapped to the first LCG; and
    the method further comprises updating the first buffer size value based on a buffer size value included in the BSR in response to receiving the BSR.

4. The method of claim 1, wherein the first priority value is greater than the second priority value.

5. The method of claim 1, wherein the LCG information further comprises:
    a third LCG (LCG2) corresponding to a third set of the one or more logical channels, the third LCG having a third priority value and a third buffer size value, and
    the second priority value is greater than the third priority value and the first priority value is greater than the second priority value.

6. The method of claim 5, wherein a signal radio bearer is mapped to the first LCG and a data radio bearer is mapped to the third LCG.

7. The method of claim 1, further comprising:
    in response to receiving the SR, activating an SR timer associated with the UE; and
    in response to expiration of the SR timer, increasing the priority of the second LCG or increasing the first buffer size value.

8. The method of claim 1, further comprising:
    in response to receiving the SR, activating an SR timer associated with the UE; and
    in response to selecting the UE, deactivating the SR timer.

9. The method of claim 1, further comprising:
    initializing a counter associated with the UE;
    in response to receiving the SR, incrementing the counter;
    determining whether the counter exceeds a counter threshold; and
    in response to determining that the counter exceeds the counter threshold, increasing the second priority value or increasing the first buffer size value.

10. The method of claim 1, further comprising:
    initializing a counter associated with the UE;
    in response to receiving the SR, incrementing the counter;
    in response to selecting the UE, re-initializing the counter.

11. The method of claim 1, wherein the first LCG corresponds to an LCG to which the UE maps the one or more LCs and the second LCG does not correspond to any LCG to which the UE maps the one or more LCs.

12. The method of claim 5, wherein the LCG information further comprises:
    a fourth LCG corresponding to a fourth set of the one or more logical channels, the fourth LCG having a fourth priority value and a fourth buffer size value, and
    a fifth LCG corresponding to a fifth set of the one or more logical channels, the fifth LCG having a fifth priority value and a fifth buffer size value, and further wherein the second priority value is greater than the third, fourth, and fifth priority values and the first priority value is greater than the second priority value.

13. The method of claim 12, wherein the first LCG, third LCG, fourth LCG, and fifth LCG each correspond to an LCG to which the UE maps one or more LCs and the second LCG does not correspond to any LCG to which the UE maps an LC.

14. The method of claim 1, further comprising:
receiving a subsequent scheduling request from the UE;
determining whether the first buffer size value is a non-zero value; and
in direct response to determining that the first buffer size value is equal to zero, setting the second buffer size value to a non-zero value.

15. A base station having an uplink scheduler configured to prioritize transmission for a user equipment (UE) from a plurality of UEs, the uplink scheduler configured to prioritize the UE by:
associating logical channel group (LCG) information with the UE by mapping one or more logical channels (LCs) to the LCG information, the LCG information comprising:
a first LCG corresponding to a first set of the one or more LCs the first LCG having a first priority value and a first buffer size value; and
a second LCG having a second priority value and a second buffer size value, characterized in that the second LCG is a dedicated scheduling resource LCG;
setting the second buffer size value to a non-zero value as a result of receiving a scheduling request (SR); and
prioritizing the transmission for the UE using the LCG information associated with the UE after setting the second buffer size value to the non-zero value.

16. The base station of claim 15, wherein the uplink scheduler is further configured to:
after prioritizing the UE, select the UE to be a UE to which a grant message will be sent in a subsequent transmission time interval (TTI); and
in response to selecting the UE, adjust the second buffer size value.

17. The base station of claim 16, wherein the uplink scheduler is further configured to:
cause the base station to transmit the grant message to the UE;
receive a buffer status report (BSR) that was transmitted by the UE, wherein the BSR indicates that the UE has data in a transmit buffer associated with a logical channel mapped to the first LCG; and
update the first buffer size value based on a buffer size value included in the BSR in response to receiving the BSR.

18. The base station of claim 15, wherein the first priority value is greater than the second priority value.

19. The base station of claim 15, wherein the LCG information further comprises:
a third LCG corresponding to a third set of the one or more logical channels, the third LCG having a third priority value and a third buffer size value, wherein
the second priority value is greater than the third priority value and the first priority value is greater than the second priority value.

20. The base station of claim 19, wherein
the LCG information further comprises:
a fourth LCG corresponding to a fourth set of the one or more logical channels, the fourth LCG having a fourth priority value and a fourth buffer size value, and
a fifth LCG corresponding to a fifth set of the one or more logical channels, the fifth LCG having a fifth priority value and a fifth buffer size value, and
the second priority value is greater than the third, fourth, and fifth priority values and the first priority value is greater than the second priority value.

21. The base station of claim 15, wherein the uplink scheduler is configured to:
in response to receiving the SR, activate an SR timer associated with the UE; and
in response to expiration of the SR timer, increase the priority of the second LCG or increase the first buffer size value.

22. The base station of claim 15, wherein the uplink scheduler is further configured to:
initialize a counter associated with the UE;
in response to receiving the SR, increment the counter;
determine whether the counter exceeds a counter threshold; and
in response to determining that the counter exceeds the counter threshold, increase the second priority value or increasing the first buffer size value.

* * * * *